United States Patent [19]
Spillman, Jr.

[11] Patent Number: 4,983,034
[45] Date of Patent: * Jan. 8, 1991

[54] COMPOSITE INTEGRITY MONITORING

[75] Inventor: William B. Spillman, Jr., Charlotte, Vt.

[73] Assignee: Simmonds Precision Products, Inc., Wilmington, Del.

[*] Notice: The portion of the term of this patent subsequent to Jun. 20, 2006 has been disclaimed.

[21] Appl. No.: 310,148

[22] Filed: Feb. 13, 1989

Related U.S. Application Data

[63] Continuation of Ser. No. 131,069, Dec. 10, 1987, Pat. No. 4,840,481.

[51] Int. Cl.$^5$ .............................................. G01B 11/16
[52] U.S. Cl. ......................................... 356/32; 73/800; 73/802; 250/227.17; 356/33
[58] Field of Search ................... 250/227, 225, 227.17; 356/32, 33, 34, 35.5, 73; 73/800, 802

[56] References Cited

U.S. PATENT DOCUMENTS

| | | | |
|---|---|---|---|
| 4,692,610 | 9/1987 | Szuchy | 73/802 X |
| 4,836,030 | 6/1989 | Martin | 73/800 |
| 4,840,481 | 6/1989 | Spillman, Jr. | 356/32 |

OTHER PUBLICATIONS

Kingsley et al., "OFDR Diagnostics for Fiber and Integrated-Optics Systems", Electronics Letters, 9 May 1985, vol. 21, No. 10, pp. 434–435.
Unsolicited Proposal for "An Investigation into Distributed Fiber Optic Strain Gauging Techniques for Composite Structure Monitoring", Hercules Aerospace Div., presented subsequent to Jan. 1, 1985 to NASA & Air Force.

*Primary Examiner*—Vincent P. McGraw
*Attorney, Agent, or Firm*—Dale R. Lovercheck

[57] ABSTRACT

An optical frequency domain distributed strain sensor for determining the strain distribution along an optical fiber includes an optical source that provides a polarization controlled optical interrogation signal having a frequency that varies in a recurring linear manner. The interrogation signal is injected into a sensor fiber embedded within a composite structure that places the fiber under strain. A portion of the interrogation signal is backscattered from the sensing fiber as a consequence of the strain experienced by the fiber and is mixed with a reference signal to produce beat frequency signals. The frequency of the beat signals is directly related the to position of backscatter in the sensing fiber while the amplitude of each beat frequency signal is directly related to the integrated strain-induced birefringence up to the backscatter point. An in-line fiber polarizer and an associated controllable polarizer control the polarization state of the interrogation signal in the sensor fiber to provide zero point sensitivity compensation and controllable testing for ambiguous strain points.

13 Claims, 4 Drawing Sheets

FIG. 1
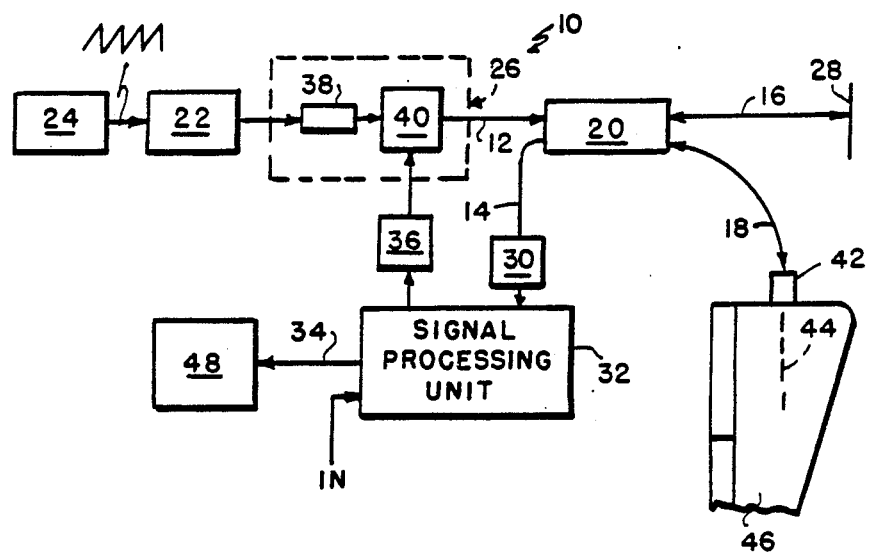
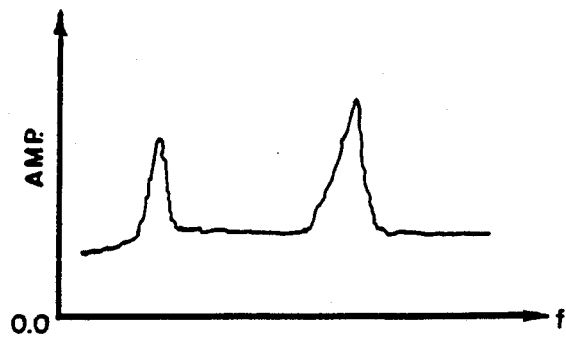
FIG. 2

COMPOSITE INTEGRITY MONITORING

This is a continuation of U.S. patent application Ser. No. 131,069 filed Dec. 10, 1987, now, U.S. Pat. No. 4,840,481.

BACKGROUND OF THE INVENTION

The present invention relates to strain detection and, more particularly, to the detection of strain distributed along an optical transmission line using an optical interrogation signal.

Various apparatus and systems have been developed for distributed strain or stress detection. In the electrical domain, for example, the effects of strain on a transmission line can be detected by time-domain reflectometry techniques in which an electrical interrogation pulse of known characteristics is transmitted on a transmission line. Any strain-induced faults in the line will alter the characteristic impedance of the line to some extent or the other and reflect part of the interrogation pulse to its source. The distance between the interrogation signal source and the strain point can be determined from the round trip time for the transmission of the interrogation pulse and the reception of the reflected pulse and from the propagation velocity within the line. In an analogous manner, the strain-induced faults or discontinuities in an optical fiber can be determined by launching a defined optical interrogation pulse into a fiber that is subjected to strain and measuring the elapsed time from the launching of the interrogation pulse to the reception of the reflected pulse.

The measurement of the strain on an elongated energy transmitting line has application in composite structures as used in aircraft and spacecraft. Composite materials, such as graphite/epoxy laminates, provide significant increases in strength-to-weigh performance compared to traditional metal structures, principally aluminum alloy, used in airframes. In applications where the structure is subjected to recurring time-varying stress as typically encountered in an aircraft application, the composite tends to fail catastrophically in an unpredictable manner and without advanced warning. Metal structures, in contrast, tend to fail by first developing micro-cracks which propagate with continued stress in a reasonably predictable manner until a total failure occurs. Various techniques, including Magnaflux type detection systems, are available to reliably detect micro-cracks in metal structures prior to their failure. Composite structures, on the other hand, are not well-suited for existing micro-crack detection techniques and, accordingly, a problem is presented in the non-destructive detection of pre-failure indicia.

Discrete strain gauges are typically used to sense strain at a defined location and can be attached to a composite structure. However, discrete location sensing may not provide meaningful information for a large composite structure and the need for wiring between the sensors and a central controller creates a practical upper limit for the number of strain sensors that can be employed. Additionally, a large number of discrete sensors attached to a composite structure can represent a significant cost disadvantage as well compromise the design flexibility of the system.

While the sensing of the structural integrity of a composite structure has principal utility in airframe evaluation, the sensing of the structural integrity also is useful in the military environment in which the structure is subjected to ballistic impact. A sensing system for a composite structure would ideally be able to function as an 'intelligent' structure and provide an automatic and reliable assessment of structural integrity immediately after a ballistic impact.

One type of sensing system that has been suggested as suitable for structural integrity sensing of composite structures has been presented by Kingsley, S. and Davies, D. in Electronic Letters *OFDR Diaonostics for Fibre and Integrated-Optic Systems*, May 9, 1985, Vol. 21, No. 10, Pg. 434–5. The Kingsley system relies on the frequency-altering effects of strain on an optical interrogation pulse in contrast to the time-domain effects described above. The system includes a laser diode that is driven by a time-varying current pulse to produce a frequency varying optical chirp that is launched into an optical fiber. As the frequency varying interrogation pulse propagates along the optical fiber, selected frequency components of the interrogated light are subject to backscatter toward the source with the backscatter at any point in the line being a function of the attendant strain at that point. The amplitude of the return signals is a function of the backscatter at the strain location as well as the cumulative effect of impurities, inclusions, micro-bending, and other attenuation producing factors. The light backscattered from the fiber is optically mixed with a reference signal from the source laser, and beat frequencies are produced with the beat frequency related to the position of the associated strain along the fiber. The Kingsley system represents a device that determines the optical loss along an optical waveguide and functions as a passive, open loop distributed intensity sensing device. Since the returned optical signal includes both an information signal and the equivalent of background noise caused by the cumulative effect of core imperfections, the signal-to-noise ratio of the Kingsley system diminishes with increased sensing fiber length and, accordingly, suffers from an inability to either zero-null the system or to increase the sensitivity of the system for a selected portion of the sensing fiber.

SUMMARY OF THE INVENTION

In view of the above, it is an object of the present invention, among others, to provide an improved system and method for the measurement of distributed strain.

It is another object of the present invention to provide an improved system and method for the measurement of distributed strain well-suited for use in sensing strain in composite structures.

It is another object of the present invention to provide an improved optical system and method for the measurement of distributed strain well-suited for use in sensing strain in composite structures as used, for example, in airborne applications.

In view of these objects, and others, the present invention provides a closed loop optical frequency domain distributed strain sensor for determining the strain distribution along a sensing optical fiber. A polarized optical signal having a frequency that varies in a recurring, preferably linear, manner is injected into the sensing optical fiber. The portion of the interrogation signal backscattered from the sensing fiber is mixed with a reference signal to produce beat frequency signals. The frequency of the beat signals is directly related to the position of backscatter in the sensing fiber while the amplitude of each beat frequency signal is directly related to the integrated strain-induced birefringence up to the backscatter point. An in-line fiber polarizer and an associated polarization controller controls the polarization state of the interrogation signal to provide zero point sensitivity compensation and controllable testing for ambiguous strain points.

The present invention advantageously provides an optical frequency domain distributed strain sensor that utilizes polarized light to provide an indication of distributed strain along an optical fiber.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a schematic block diagram of an optical frequency domain distributed strain sensor and related optical circuitry for detecting strain distributed along a sensing optical fiber embedded within a composite structure;

FIG. 2 is an idealized graphical representation of an amplitude vs. frequency plot illustrating beat frequency output;

DESCRIPTION OF THE PREFERRED EMBODIMENT

Figure 3:
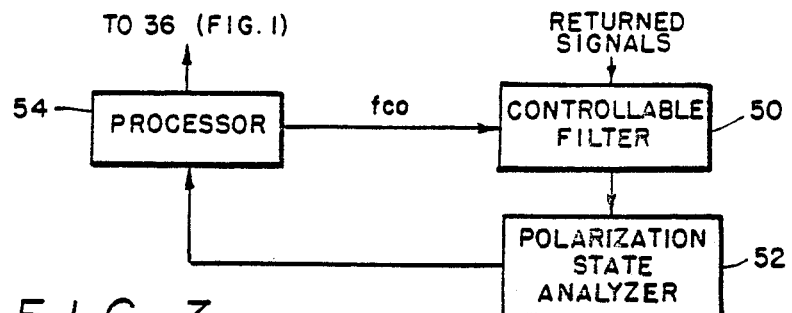
FIG. 3 is a functional block diagram of a signal processing control unit illustrated in FIG. 1.

An optical frequency domain distributed strain sensor in accordance with the present invention is shown in schematic block diagram form in FIG. 1 and designated generally therein by the reference character 10. As shown, the optical frequency domain distributed strain sensor 10 is defined by a single-mode optical fiber circuit that includes an input fiber 12, an output fiber 14, a reference fiber circuit 16, and a sensor fiber circuit 18 described more fully below. The various fibers are interconnected through an optical coupler 20 so that optical energy from the input fiber 12 is distributed to the reference fiber circuit 16 and the sensor fiber circuit 18 and optical energy from both the reference fiber circuit 16 and the sensor fiber circuit are distributed to the output fiber 14. The coupler may take the form of a discrete device, an integrated-optic device, or a simple lateral coupling between the fibers. Where a lateral coupling is utilized, the input fiber 12 and the reference fiber circuit 16 can be formed from a single fiber and, in an analogous manner, the output fiber 14 and the sensor fiber circuit 18 can be formed from a single fiber with both fibers laterally coupled over a discrete length to effect the desired optical coupling.

An optical source 22 is driven by a variable current source 24 as described below to introduce recurring optical interrogation pulses that are passed through a polarization controller, indicated generally at 26, to the coupling 20 for distribution to the reference fiber circuit 16 and the sensor fiber circuit 18. The remote end of the reference fiber circuit 16 is provided with a reflective end surface 28 that is effective to reflect optical energy back towards the coupling 20 for distribution into the output fiber 14 to a photodetector 30 connected in circuit with a signal processing unit 32. Output information as to the sensed strain and its distribution is provided at information output 34 with control signals provided to a driver 36 which, in turn, provides control signals to the polarization controller 26. The polarization controller 26 includes a polarizer that functions to polarize the optical energy from the optical source 22 in an arbitrary initial state and a selectively controllable polarizer 40 that rotates or otherwise alters the polarization state of the optical energy provided through the polarizer 38 in response to control signals provided by the polarization driver 36. The controllable polarizer 40 permits an arbitrary amount of bias retardation to be introduced into the optical interrogation signal passed through the coupler 20 into the sensor fiber circuit 18. The controllable polarizer can take the form of an electrically controlled PZT material, for example, through which the optical energy is passed.

A connector 42 is provided in the sensing fiber circuit 18 and connects to a sensing fiber 44 that is embedded or otherwise attached to a strain-producing structure 46, such as a graphite/epoxy composite that is subject to strain. In the embodiment of FIG. 1, the strain-producing structure 46 is presented as a portion of the wing structure of an aircraft.

In the preferred embodiment, the optical source 22 takes the form of a laser diode that produces a variable frequency output as a function of its drive current. The variable current source 24 provides a current output that includes a constant current bias with a superposed recurring ramp (i.e., a sawtooth pattern) to cause the optical source 22 to provide a recurring optical signal output that varies in frequency in a time-predictable, preferably linear, manner from an initial frequency $F_1$ to a second frequency $F_2$. A representative optical source 22 includes the Hitachi HLP1600 laser diode which produces an output in the 850 nm. range and can be driven by currents in the 100 ma. range to produce frequency deviations between frequencies $F_1$ and $F_2$ on the order of 100 or so GHz. In the preferred embodiment, the optical energy from the laser diode is polarized along a selected or otherwise predetermined orientation and the polarizer 38 is aligned with the initial polarization of the laser diode for maximum transmission to the controllable polarizer 40.

The optical interrogation pulses provided by the optical source 22 are launched into controllable polarizer 26 with the polarization state initialized by the polarizer 38 and this initial polarization state further altered by the variable polarizer 40 to provide interrogation pulses of an initially predetermined orientation along the input fiber to the coupler 20. A portion of the interrogation signal enters the reference fiber circuit 16 and a portion of the interrogation signal also enters the sensor fiber circuit 18. The portion of the interrogation signal entering the reference fiber circuit 16 is reflected at 28 and a portion of that reflected energy is passed through the coupler 20 into the output fiber 14 and to the photodetector 30. A portion of the optical interrogation pulse provided through the coupler 20 from the optical source 22 is passed into the sensor fiber circuit 18 and through the connector interface 42 and to the sensing fiber 44. Any stress or strain to which the composite structure 46 is subjected will be presented to the sensor fiber 42.

As is known, optical energy transmitted through an optical fiber core will be subjected to backscattering because of the presence of impurities in the core or at the core/cladding interface, particulate inclusions, and variations in the density of the core silica or a variation in the concentration of the dopants. In addition, backscattering is a function of the relative stress that the core is subjected to, this stress causing relative changes in the index of refraction which represent a change in transmission impedance sufficient to increase or decrease backscatter.

As a consequence of the strain experienced along the length of the sensor fiber 44 within the composite structure 46, portions of the polarized interrogation pulse will be backscattered toward the source with the backscatter increased at various points along the sensing fiber 44 as a function of any strain sufficient to increase backscatter. The polarization state of the interrogation energy will be modified as a function of the stress presented to the fiber core by the structure 46 acting on the sensing fiber 44.

The backscattered optical energy is returned through the connector 42 and the fiber 18 to the coupler 20. The reference signal returned through the reference signal circuit 16 to the coupler 20 and is optically mixed with the backscattered optical energy provided from the sensor fiber circuit 18. The two signals, that is, the reference signal provided through the reference signal circuit 16 and the backscattered information-bearing signal from the sensing fiber 44 are effectively autodyned to produce sum and difference beat frequency signals of which the difference signals represent strain-magnitude and location information. The beat signals are presented to and detected by the photodetector 30 which provides an electrical output to the signal processing unit 32.

As shown in idealized fashion in FIG. 2, the frequency of the backscattered information signal is a direct function of the distance to the backscatter point or location in the sensing fiber 42 where the strain-induced backscatter originates with a lower frequency beat signal representing backscatter locations that are closer to the source than relatively higher frequency beat signals. The relationship between the various beat signals and their amplitudes can be analyzed, for example, with a spectrum analyzer 48 to provide scale factor information for the frequency-spaced beat signals. The amplitudes of the various beat signals are directly related to the integral of the strain-induced birefringence along the fiber up to the point at which the backscatter originates; a lower strain producing a lower backscatter and a lower amplitude beat frequency signal when optically mixed with the reference signal.

Since the amount of backscattered light increases with increased sensing fiber lengths, the ability to discriminate strain-induced birefringence at a selected location relative to background 'noise' can be diminished in certain applications. Thus, as the polarized interrogation light travels down the sensing fiber 44, its polarization state will be affected by the distributed birefringence along the fiber core. Likewise, light backscattered from a strain location of interest will likewise be subjected to additional changes in its polarization state. As can be appreciated, the polarization controller 26 allows a high degree of control of the polarization of the interrogation energy in such a way that the cumulative or integrated effects of strain-induced birefringence on the polarized interrogation light can be 'nulled' from the output so that selected path lengths of the sensing fiber 44 can be effectively 'tuned' for greater sensitivity. More specifically, the polarization controller 26 can be adjusted to re-orient the polarization state of the optical interrogation pulse to null out the effect of strain-induced birefringence for a selected portion of the sensing fiber 44 so that backscatter from a location downstream of a selected location will not be affected by the cumulative strain-induced backscatter up to that location. Additionally, the polarization controller 26 can be used to zero-null the system. When the composite structure 46 is in an unstressed state, the polarization controller 26 is adjusted by an appropriate signal from the polarization driver 36 to compensate for and null out the quiescent, cumulative birefringence in the sensing fiber 44 so that a higher signal-to-noise ratio will be obtained when the composite structure 46 is subjected to strain.

In addition, the system can interrogate a specific location in the sensing fiber 44, or more preferably, interrogate successive locations to obtain distributed stain information. More specifically and as shown in the functional block diagram of FIG. 3 and the flow diagram of FIG. 4, the signal processing unit 32 of FIG. 1 includes a controllable frequency filter 50 that receives the returned signals and, after filtering, provides the filtered signals to a polarization state analyzer 52. The frequency filter 50, which can take the form of an active filter, is selectively controllable to establish a cut-off frequency $F_{co}$ and effectively function as a low-pass filter below that cut-off frequency. Since the frequency of the returned signals is a function of the distance along the sensing fiber 44 of any strain-induced birefringence location, a selected cut-off frequency $F_{co}$ will effectively pass light returned along the sensing fiber 44 up to that selected location and attenuate light beyond the selected location. The polarization state analyzer 52 operates to sense a polarization state, e.g., one or more of the Stokes parameters, and provide an output indication to a control processor 54 which, in response to an input signal, issues appropriate commands to the polarization driver 36. The feedback path provided through the polarizer driver 36 thus serves to provide a closed, active control loop in which the polarization controller 26 is operated in response to the output of the processor 54. The processor 54 is of conventional organization and includes I/O and data ports, a read-only memory (ROM) containing a stored control program that implements the sequence described below in FIG. 4, a random-access memory (RAM) for storing values assigned to variables; an arithmetic-logic unit (ALU); one or more storage registers Reg. A, Reg. B, Reg. C . . . , for manipulating data; and a clock CLK.

Figure 4:
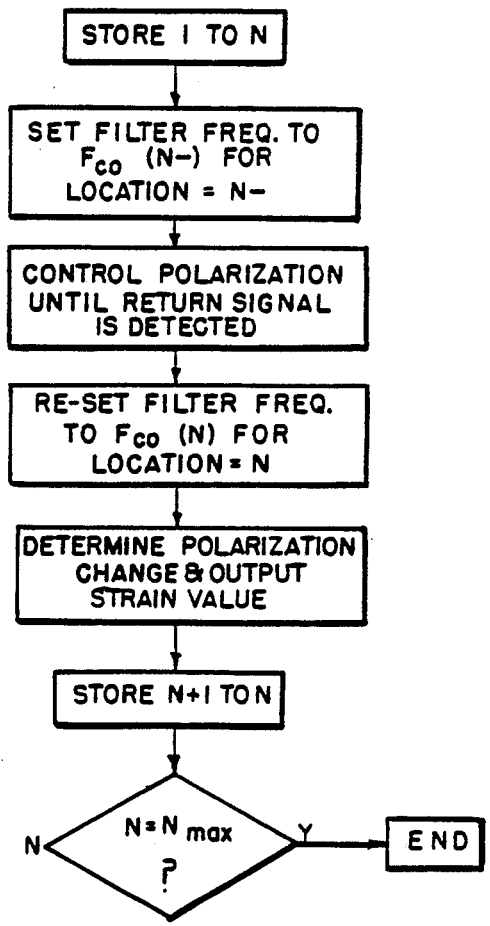
FIG. 4 is flow diagram of a control sequence for incrementally interrogating successive sections of an optical fiber sensor.

An exemplary control program for interrogating N selected locations along the sensing fiber 44 with a closed-loop autonull is shown in the flow diagram of FIG. 4. As shown, a variable N is initialized to 1 and the processor 54 commands the frequency filter 50 to operate at a cut-off frequency $F_{co}(N-)$ to pass return signals for a location N—, the N— location being just prior to the location N of interest. Thereafter, the processor 54 controls the polarization driver 36 to change the polarization parameters until a selected polarization state is detected by the polarization state analyzer 52 with the frequency range passed by the frequency filter 50, this signal detection indicating that an interrogation signal of a known polarization state is being provided to the location N−. Thereafter, the processor 54 controls the frequency filter 50 to change (viz., increase) the cut-off frequency $F_{co}(N)$ to a frequency for the location N of interest. The polarization state of the returned signals of the location N is compared with the immediately preceding location N− with the changes being a function, in part, of the strain-induced birefringence at the location N of interest. The variable N is incremented and the procedure continued in a recurring sequence until the variable N attains its preselected maximum.

As can be appreciated by those skilled in the art, the frequency filter 50 can be operated in a manner converse to that described above, that is, an initial, relatively high $F_{co}$ can be selected subsequently lowered in decremental steps in contrast to the incrementing described above. In addition, the frequency filter 50 can be controlled to provide a pass band function that allows a relatively higher gain interrogation of a selected segment of the sensing fiber 44.

Figure 5:
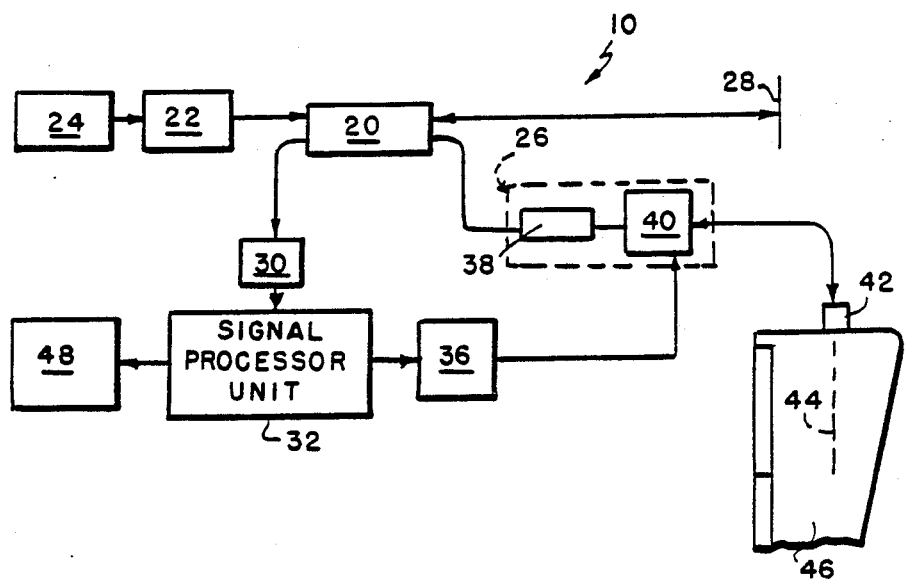
FIG. 5 is a schematic diagram of a variation of the optical frequency domain distributed strain sensor of FIG. 1.

A variation of the optical frequency domain distributed strain sensor of FIG. 1 is shown in FIG. 5 and designated generally therein by the reference character 10' and in which like reference characters refer to like components. As shown, the polarization controller 26 is re-located to the sensor fiber circuit 18 under the control of the polarization driver 36 and the signal processing unit 32 to control the interrogation signal in a manner consistent with that of the embodiment of FIG. 1 and the control program of FIG. 4.

Figure 6:
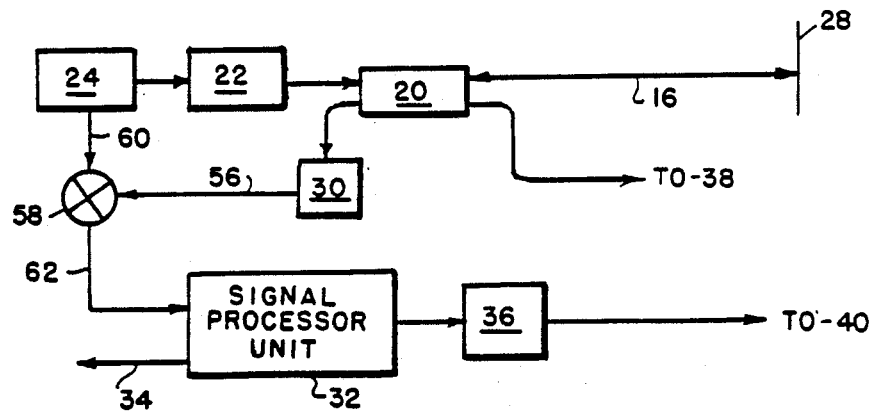
FIG. 6 is a schematic diagram of another embodiment of the optical frequency domain distributed strain sensor of the present invention.

In the embodiments of FIGS. 1 and 5, the optical interrogation signals and their returned signals are optically mixed to obtain distributed strain information for the sensing fiber 44. In addition to optical mixing, electrical domain mixing can be used to obtain the desired information. In this case, the optical signal itself is not chirped, but is modulated via a linear FM ramp modulation of the laser diode. As shown in FIG. 6, the output of the photodetector 30 is provided along path 56 to a RF mixer 58 which accepts the functional equivalent of a local oscillator signal along path 60 from the driver 24. The output of the RF mixer 58 is provided along path 62 to the signal processing unit 32 for processing in a manner consistent with that discussed above.

Figure 7:
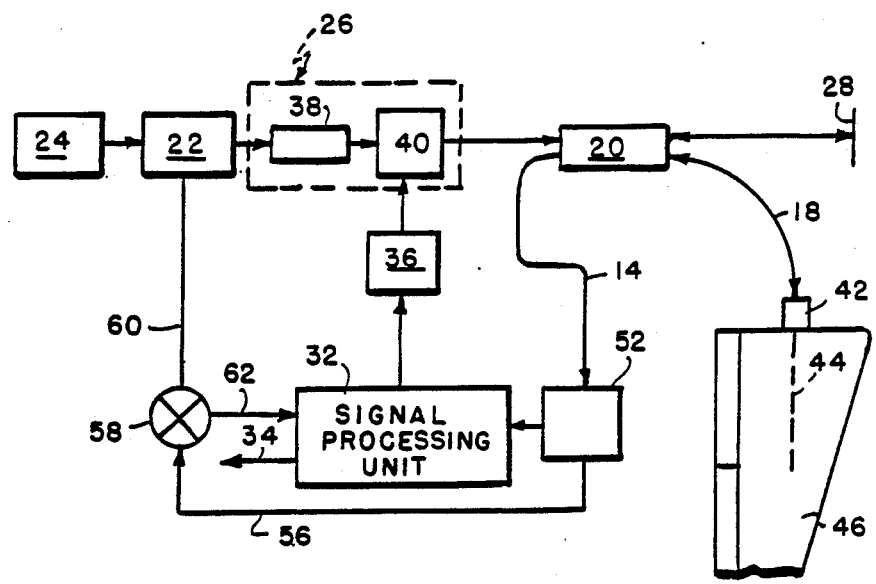
FIG. 7 is a schematic diagram of another embodiment of the optical frequency domain distributed strain sensor of the present invention.

A variation of the embodiments of FIGS. 5 and 6 is shown in FIG. 7 in which the signals returned along the fiber 14 are presented to a polarization state analyzer 52 which provides each of the Stokes vector parameters to the mixer 58 via path 58 in a successive serial manner (e.g., time-division mulitplexing).

Figure 8:
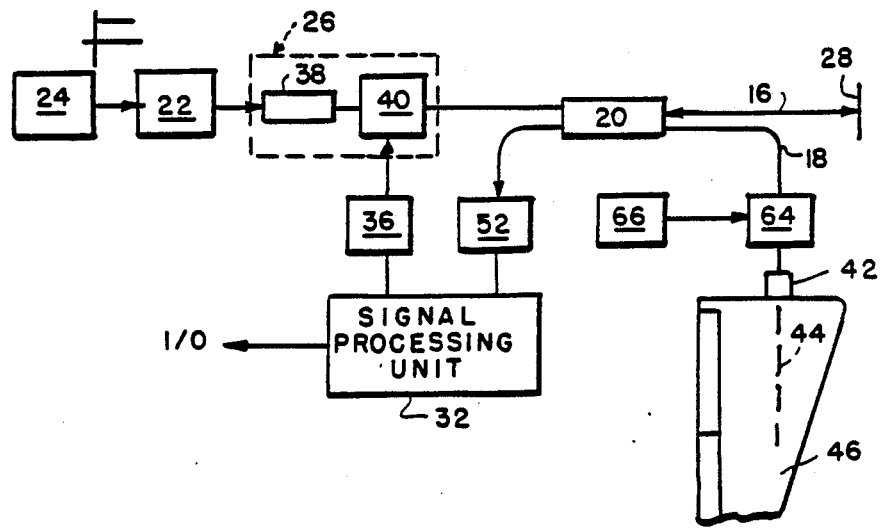
FIG. 8 is a schematic diagram of still another embodiment of the optical frequency domain distributed strain sensor of the present invention.

In the various embodiments described above, the optical source 22 is modulated by time-varying drive current. In the embodiment of FIG. 8, the optical source 22 is driven by a constant current source 24' to provide a continuous wave (CW) output to the polarization controller 26, the coupler 20, and the reference signal circuit 16. A portion of the continuous wave energy is provided through the coupler 20 to the sensor fiber circuit 18 for intensity modulation by an optical intensity modulator 64 that is driven by an RF driver 66 that is effective to modulate the intensity of the continuous wave interrogation between two value in a recurring manner. The optical intensity modulator 64 may take the form of a light transmitting material that is responsive to the electrical stimulation of the RF driver 66 to affect light transmission through the material. The intensity modulated interrogation energy enters the sensing fiber 44 and is backscattered and time-delayed from the instantaneous intensity modulation imposed by the modulator 64 with beat signals produced that correspond to the origination location of the backscattered signals. The beat signal are provided to the polarization state analyzer 52 and to the signal processing unit 32 to provide location and strain distribution information.

The present invention advantageously provides a polarimetric optical frequency domain distributed strain sensor that includes controllable polarization optics and retardation optics that can actively modify the polarization state of the modulated interrogation energy injected into a sensing fiber. The polarization controller can be used to "null out" the birefringence effects of any portion of the sensing fiber to allow selected points to be interrogated at a maximum signal-to-noise ratio. Alternately, the return optical signal can be maintained at some quadrature condition just before a measurement point and the stress at that point determined from the control input to the controllable polarizer.

Thus it will be appreciated from the above that as a result of the present invention, a polarimetric optical frequency domain distributed strain sensor is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method of composite integrity monitoring by sensing strain distributed along an optical fiber, comprising the steps of:
    providing a composite structure, and an optical fiber, said structure comprising composite material, said optical fiber being embedded in said composite material, said optical fiber being subjected to strain;
    launching initial frequency varying modulated optical energy having a selectively controllable polarization state into said optical fiber;
    providing a reference signal representative of the modulated optical energy;
    mixing a portion of the optical energy backscattered from the fiber with a portion of the reference signal to produce a beat signal, the frequency of which is representative of strain at a location along the fiber;
    sensing the polarization state of the backscattered optical energy; and
    controlling the polarization state of said initial optical energy launched in response to said beat signal.

2. The method of claim 1, wherein said controlling step comprises controlling the polarization state of the optical energy launched in response to said beat signal, to reduce the effect of backscattering at locations other than said strain location.

3. The method of claim 1 wherein said structure is an aircraft.

4. The method of claim 1 wherein said structure is a spacecraft.

5. The method of claim 1 wherein said composite material comprises graphite.

6. A method of composite integrity monitoring by sensing strain at a selected location along an optical fiber, comprising the steps of:
 providing a composite structure, and an optical fiber, said structure comprising composite material, said optical fiber being embedded in said composite material, said optical fiber being subjected to strain;
 launching initial frequency varying optical energy having a selectively controllable polarization state into said optical fiber;
 providing a reference signal representative of the modulated optical energy;
 sensing the polarization state of the backscattered optical energy from the fiber below a selected frequency;
 controlling the polarization state of said initial optical energy launched in response to said sensed polarization state of the backscattered energy to minimize backscatter; and
 increasing the selected frequency to correspond to a selected location and mixing a portion of the optical energy backscattered from the fiber with a portion of the reference signal to produce a beat signal representative of strain at the selected location.

7. The method of claim 6 wherein said structure is an aircraft.

8. The method of claim 6 wherein said structure is a spacecraft.

9. The method of claim 6 wherein said composite material comprises graphite.

10. A method of composite integrity monitoring by sensing strain at successive selected locations along an optical fiber, comprising the steps of:
 providing a composite structure, and an optical fiber, said structure comprising composite material, said optical fiber being embedded in said composite material, said optical fiber being subjected to strain;
 launching initial frequency varying optical energy having a selectively controllable polarization state into said optical fiber;
 providing a reference signal representative of the modulated optical energy;
 sensing the polarization state of the backscattered optical energy from the fiber below a selected frequency;
 controlling the polarization state of said initial optical energy launched in response to said sensed polarization state of the backscattered energy to minimize backscatter;
 increasing the selected frequency to correspond to a selected location and mixing a portion of the optical energy backscattered from the fiber with a portion of the reference signal to produce a beat signal representative of strain at the selected location; and
 repeating the second, third, and fourth steps at selectively incremented frequencies.

11. The method of claim 10 wherein said structure is an aircraft.

12. The method of claim 10 wherein said structure is a spacecraft.

13. The method of claim 10 wherein said composite material comprises graphite.

* * * * *